US012650316B2

(12) United States Patent
Labisch et al.

(10) Patent No.: US 12,650,316 B2
(45) Date of Patent: Jun. 9, 2026

(54) METHOD FOR GENERATING A MAP FOR AUGMENTED REALITY DEVICES IN AN INDUSTRIAL FACILITY

(71) Applicant: Siemens Aktiengesellschaft, Munich (DE)

(72) Inventors: Daniel Labisch, Karlsruhe (DE); Asa Macwilliams, Fürstenfeldbruck (DE); Gert De Nul, Aalst (BE); Andoni Gonzalo, Berango (ES); Joseph Newman, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 77 days.

(21) Appl. No.: 18/266,636

(22) PCT Filed: Dec. 9, 2021

(86) PCT No.: PCT/EP2021/084882
§ 371 (c)(1),
(2) Date: Jun. 12, 2023

(87) PCT Pub. No.: WO2022/128710
PCT Pub. Date: Jun. 23, 2022

(65) Prior Publication Data
US 2024/0044668 A1 Feb. 8, 2024

(30) Foreign Application Priority Data
Dec. 17, 2020 (EP) .................................... 20215025

(51) Int. Cl.
*G01C 21/00* (2006.01)
*G06T 11/26* (2026.01)
*G06T 19/00* (2011.01)

(52) U.S. Cl.
CPC ............ *G01C 21/383* (2020.08); *G06T 11/26* (2026.01); *G06T 19/006* (2013.01)

(58) Field of Classification Search
CPC ...... G06T 11/206; G06T 19/006; G06F 3/011; G02B 27/01; G01C 21/383
See application file for complete search history.

(56) References Cited

U.S. PATENT DOCUMENTS

2014/0126767 A1 5/2014 Daon et al.
2016/0086385 A1 * 3/2016 Gourlay .................. G06T 19/20
382/154

(Continued)

FOREIGN PATENT DOCUMENTS

CN 103365911 10/2013
CN 105701771 6/2016

(Continued)

OTHER PUBLICATIONS

PCT International Search Report dated Apr. 21, 2022 based on PCT/EP2021/084882 filed Dec. 9, 2021.

(Continued)

*Primary Examiner* — Jin Cheng Wang
(74) *Attorney, Agent, or Firm* — Cozen O'Connor

(57) ABSTRACT

A method for generating a map for augmented reality devices in an industrial facility that includes a plurality of subspaces, wherein each subspace from the plurality of subspaces includes a plurality of anchors, where the method includes obtaining position information of a first subspace from the plurality of subspaces, determining a coordinate system for the first subspace based on the obtained position information and a plurality of anchors of the first sub space, and includes calculating a relative position and an orientation of at least one neighboring subspace based on the determined coordinate system to generate the map based on the position information of the first subspace and the relative (Continued)

position of the at least one neighboring subspace, where the at least one neighboring subspace includes at least one anchor in an area overlapping the first subspace.

9 Claims, 3 Drawing Sheets

(56) References Cited

U.S. PATENT DOCUMENTS

| | | | | |
|---|---|---|---|---|
| 2017/0345167 | A1* | 11/2017 | Ard | G06T 19/006 |
| 2018/0285052 | A1* | 10/2018 | Eade | G06F 3/1423 |
| 2019/0197785 | A1* | 6/2019 | Tate-Gans | G06T 19/006 |
| 2019/0287311 | A1* | 9/2019 | Bhatnagar | G01S 5/02523 |
| 2019/0304146 | A1* | 10/2019 | Buschbeck | G06T 7/73 |
| 2020/0051328 | A1 | 2/2020 | Mohan et al. | |
| 2020/0090407 | A1 | 3/2020 | Miranda et al. | |
| 2020/0175764 | A1* | 6/2020 | Romea | G06T 19/006 |
| 2020/0302615 | A1* | 9/2020 | Lin | G06T 17/00 |
| 2020/0349350 | A1 | 11/2020 | Toh et al. | |
| 2024/0062579 | A1* | 2/2024 | Chen | G06V 40/171 |

FOREIGN PATENT DOCUMENTS

| | | |
|---|---|---|
| CN | 110930495 | 3/2020 |
| CN | 111913565 | 11/2020 |
| WO | 2014026021 | 2/2014 |

OTHER PUBLICATIONS

Shi et al. "A new approach and procedure for generalising vector-based maps of real-world features"; Giscience & Remote Sensing, vol. 50; No. 4, Aug. 1, 2013.

* cited by examiner

Figures 2, 3:
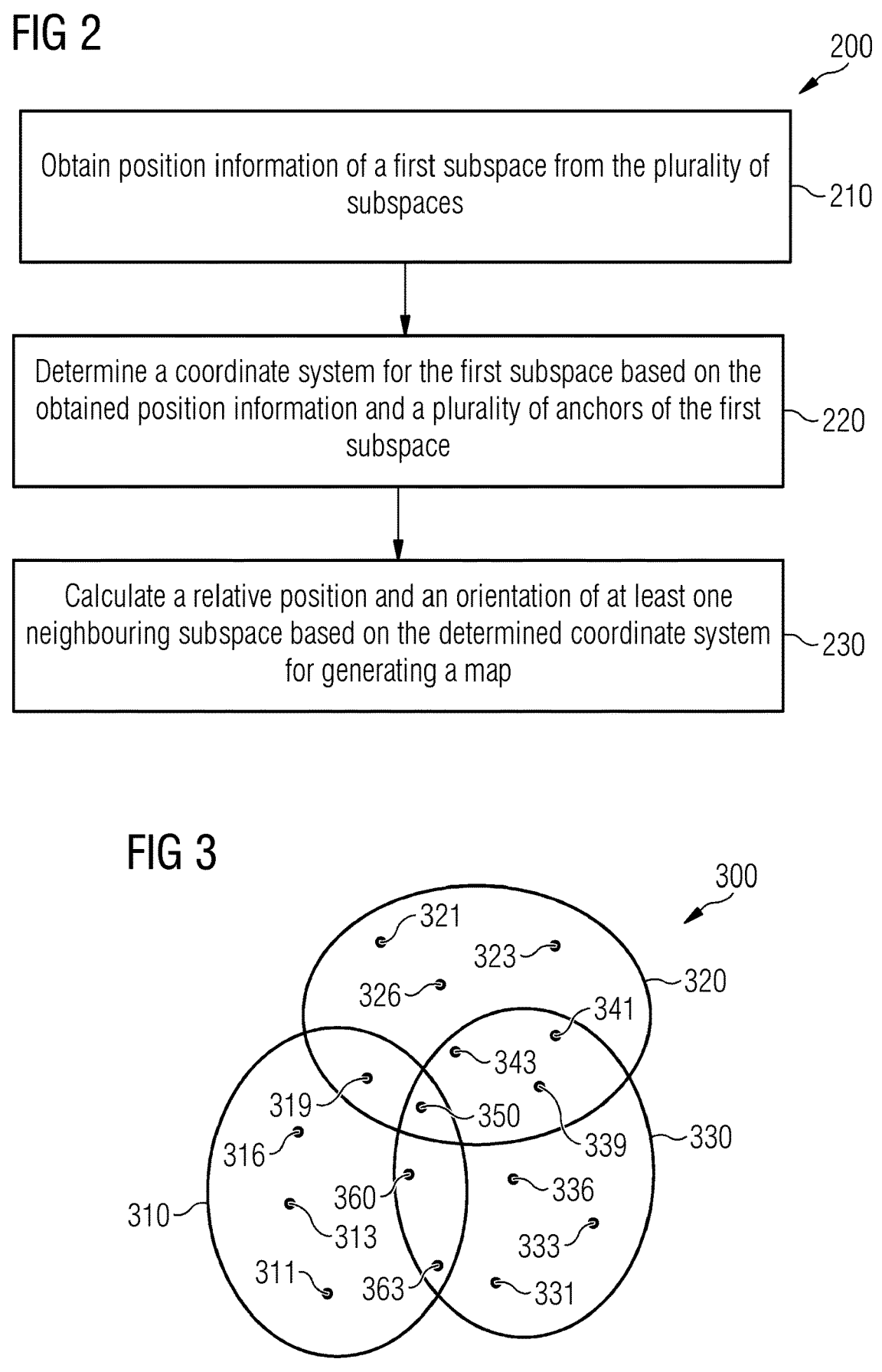

Obtain position information of a first subspace from the plurality of subspaces ~210

Determine a coordinate system for the first subspace based on the obtained position information and a plurality of anchors of the first subspace ~220

Calculate a relative position and an orientation of at least one neighbouring subspace based on the determined coordinate system for generating a map ~230

METHOD FOR GENERATING A MAP FOR AUGMENTED REALITY DEVICES IN AN INDUSTRIAL FACILITY

CROSS-REFERENCE TO RELATED APPLICATIONS

This is a U.S. national stage of application No. PCT/EP2021/084882 filed 9 Dec. 2021. Priority is claimed on European Application No. 20215025.6 filed 17 Dec. 2020, the content of which is incorporated herein by reference in its entirety.

BACKGROUND OF THE INVENTION

1. Field of the Invention

The present invention relates to an augmented reality device, a server, non-transitory storage mediums and a method for generating a map for augmented reality devices in an industrial facility comprising a plurality of subspaces.

2. Description of the Related Art

Augmented reality (AR) applications provide an interactive experience to a user in a real-world environment. Objects that reside in the real-world environment are augmented by computer-generated information. The displayed overlaid information can be interwoven in the augmented reality with the physical real-world such that it is perceived by the user as an immersive aspect of the real environment. Augmented reality can be used to enhance natural environments or situations and offer perceptually enriched experiences to the user or operator. Augmentation techniques are typically performed in real time and in a semantic context with environmental elements or objects.

In many use cases, it is necessary to place augmented reality annotations (i.e., the displayed overlaid information) relative to a specific location or object in the physical real-world. In industrial applications, this is particularly useful in relation to information that is relevant to a physical infrastructure. For example, in relation to machine commissioning, service and maintenance, etc., relevant information like the type of material/parameters etc., can be provided upfront and/or annotated persistently during the commissioning, service and maintenance activities.

Many different approaches exist for creating augmented reality content and displaying the created augmented reality content. One such approach is a marker-based augmented reality display technique where an augmented reality content is created in a three-dimensional graphics programming environment and anchored to a two-dimensional visual marker. The augmented reality content is then retrieved when this two-dimensional visual marker is read by a camera of a client device/mobile device handled by a user. In another approach, instead of two-dimensional visual markers, real objects, such as industrial equipment, are scanned and detected by client devices and then augmented reality content associated with the real object is retrieved and displayed. In another approach, augmented reality content is retrieved based on the location of the client device. For example, augmented reality is geographically referenced and fetched based on the location of the client device determined by location detection technique, such as GPS and/or wide-area RF location technology. A further conventional approach is marker-based optical tracking technology. A camera on the augmented reality device recognizes optical markers that are placed at different positions throughout the plant. Each optical marker is designed to be easily recognizable by image processing techniques. A piece of software on the augmented reality device detects the marker, thus identifying which part of the plant the user is in; and then performs pose estimation based on the perspective in which the marker appears from the devices' camera position. Thus, when a marker is detected, the AR device has a good estimation of exactly where it is within the plant. This technology has the drawback that special markers must be placed at exactly defined locations in the plant.

Each of the above-listed technologies suffers from some deficiencies, e.g., in terms of preparation effort, in long-term durability of markers, in spatial accuracy, or in interoperability across these technologies. Accordingly, there is a need to provide a method and apparatus for augmenting a physical infrastructure precisely at exact positions relative to the real equipment.

SUMMARY OF THE INVENTION

In view of the foregoing, it is therefore an object of the invention to provide a method for generating a map for augmented reality devices in an industrial facility.

This and other objects and advantages are achieved in accordance with the invention by a method for generating a map for augmented reality devices in an industrial facility comprising a plurality of subspaces. Each subspace from the plurality of subspaces comprises a plurality of anchors, where the plurality of anchors of a corresponding subspace includes at least one anchor located in an area overlapping with another subspace from the plurality of subspaces. The method comprises obtaining position information of a first subspace from the plurality of subspaces, determining a coordinate system for the first subspace based on the obtained position information and a plurality of anchors of the first subspace; and calculating, a relative position and an orientation of at least one neighboring subspace based on the determined coordinate system, for generating the map based on the position information of the first subspace and the relative position of the at least one neighboring subspace. The at least one neighboring subspace includes at least one anchor in an area overlapping the first subspace.

Accordingly, the current disclosure describes a method for generation of a map that can ensure the augmented reality display is generated effectively. Errors due to improper localization are reduced by using the generated map.

In an exemplary embodiment, the method further comprises obtaining position information of the first sub space from the plurality of sub spaces. Accordingly, the position information may be retrieved from a location server or by a localization sub-system within a portable device. In an exemplary embodiment, the method comprises generating a graph associated with the plurality of subspaces, where the graph comprises a plurality of nodes and edges, where each node from the plurality of nodes is associated with at least one of a sub space from the plurality of subspaces and an anchor from a first set of anchors, where each anchor from the first set of anchors is in at least one area overlapping at least one subspace and another subspace from the plurality of subspaces.

The objects and advantages in accordance with the invention are also achieved by a method for displaying data on an augmented reality device in an industrial facility comprising of a plurality of sub spaces. The method comprises determining a first subspace and a position and an orientation of the augmented reality device in the first subspace, where the augmented reality device is within the first subspace in the industrial facility, determining at least one other subspace based on the orientation of the augmented reality device in the first subspace, for displaying data associated with at least one object in the at least one subspace, where each subspace from the at least one other subspace includes at least one anchor in an area overlapping at least one of the first subspace and another subspace from the at least one other subspace; and populating a display of the augmented reality device with at least one data element associated with at least one object of the first subspace and the at least one other sub space. In an exemplary embodiment, the method further comprises determining a first set of anchors in the first subspace for determining the first sub space and the orientation and position of the augmented reality device in the first subspace, where each anchor from the first set of anchors is a physical identifier affixed at a corresponding location within the first subspace.

In another exemplary embodiment, the method further comprises generating a map for determining the first sub-space and the orientation and position of the augmented reality device, using at least one mapping sensor.

The objects and advantages are also achieved by a server for generating a map for augmented reality devices in an industrial facility comprising a plurality of subspaces, where each subspace from the plurality of subspaces comprises a plurality of anchors, and where the plurality of anchors of a corresponding subspace includes at least one anchor located in an area overlapping with another subspace from the plurality of subspaces. The server comprises at least one processor connected to a non-transitory memory module. The at least one processor is configured to obtain position information of a first subspace from the plurality of sub-spaces; determine a coordinate system for the first subspace based on the obtained position information and a plurality of anchors of the first subspace; and calculate, a relative position and an orientation of at least one neighboring subspace based on the determined coordinate system, for generating the map based on the position information of the first subspace and the relative position of the at least one neighboring subspace, where the at least one neighboring subspace includes at least one anchor in an area overlapping the first subspace.

The objects and advantages in accordance with the invention are also achieved by a non-transitory storage medium for generating a map for augmented reality devices in an industrial facility comprising a plurality of subspaces, where each subspace from the plurality of subspaces comprises a plurality of anchors, and where the plurality of anchors of a corresponding subspace includes at least one anchor located in an area overlapping with another subspace from the plurality of subspaces. The non-transitory storage medium comprises a plurality of instructions which, when executed on at least one processor, cause the at least one processor to obtain position information of a first sub space from the plurality of subspaces; determine a coordinate system for the first subspace based on the obtained position information and a plurality of anchors of the first subspace; and calculate, a relative position and an orientation of at least one neigh-boring subspace based on the determined coordinate system, for generating the map based on the position information of the first subspace and the relative position of the at least one neighboring subspace, where the at least one neighbouring subspace includes at least one anchor in an area overlapping the first subspace.

The objects and advantages in accordance with the invention are additionally achieved by an augmented reality device for displaying data associated with at least one object in an industrial facility comprising a plurality of sub spaces. The augmented reality device comprises at least one processor connected to a non-transitory memory module, where the at least one processor is configured to determine a first subspace and a position and an orientation of the augmented reality device in the first subspace, where the augmented reality device is within the first subspace in the industrial facility; determine at least one other subspace based on the orientation of the augmented reality device in the first subspace, for displaying data associated with at least one object in the at least one subspace, where each subspace from the at least one other subspace includes at least one anchor in an area overlapping at least one of the first subspace and another subspace from the at least one other subspace; and populate a display of the augmented reality device with at least one data element associated with at least one object of the first sub space and the at least one other subspaces.

The objects and advantages in accordance with the invention are additionally achieved by a non-transitory storage medium for displaying data associated with at least one object in an industrial facility comprising a plurality of subspaces, where the non-transitory storage medium comprises a plurality of instructions which, when executed on at least one processor, cause the at least one processor to determine a first subspace and a position and an orientation of the augmented reality device in the first subspace, where the augmented reality device is within the first sub space in the industrial facility; determine at least one other subspace based on the orientation of the augmented reality device in the first subspace, for displaying data associated with at least one object in the at least one subspace, where each subspace from the at least one other subspace includes at least one anchor in an area overlapping at least one of the first subspace and another subspace from the at least one other subspace; and populate a display of the augmented reality device with at least one data element associated with at least one object of the first subspace and the at least one other subspace.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and proce-dures described herein.

BRIEF DESCRIPTION OF THE DRAWINGS

The following detailed description references the draw-ings, in which:

FIG. 2 illustrates an exemplary flowchart of the method for generating a map for augmented reality devices in an industrial facility in accordance with the invention;

FIG. 3 illustrates a logical representation of a section of the industrial facility comprising three sub spaces in accordance with the invention;

DETAILED DESCRIPTION OF THE EXEMPLARY EMBODIMENTS

Figure 1:
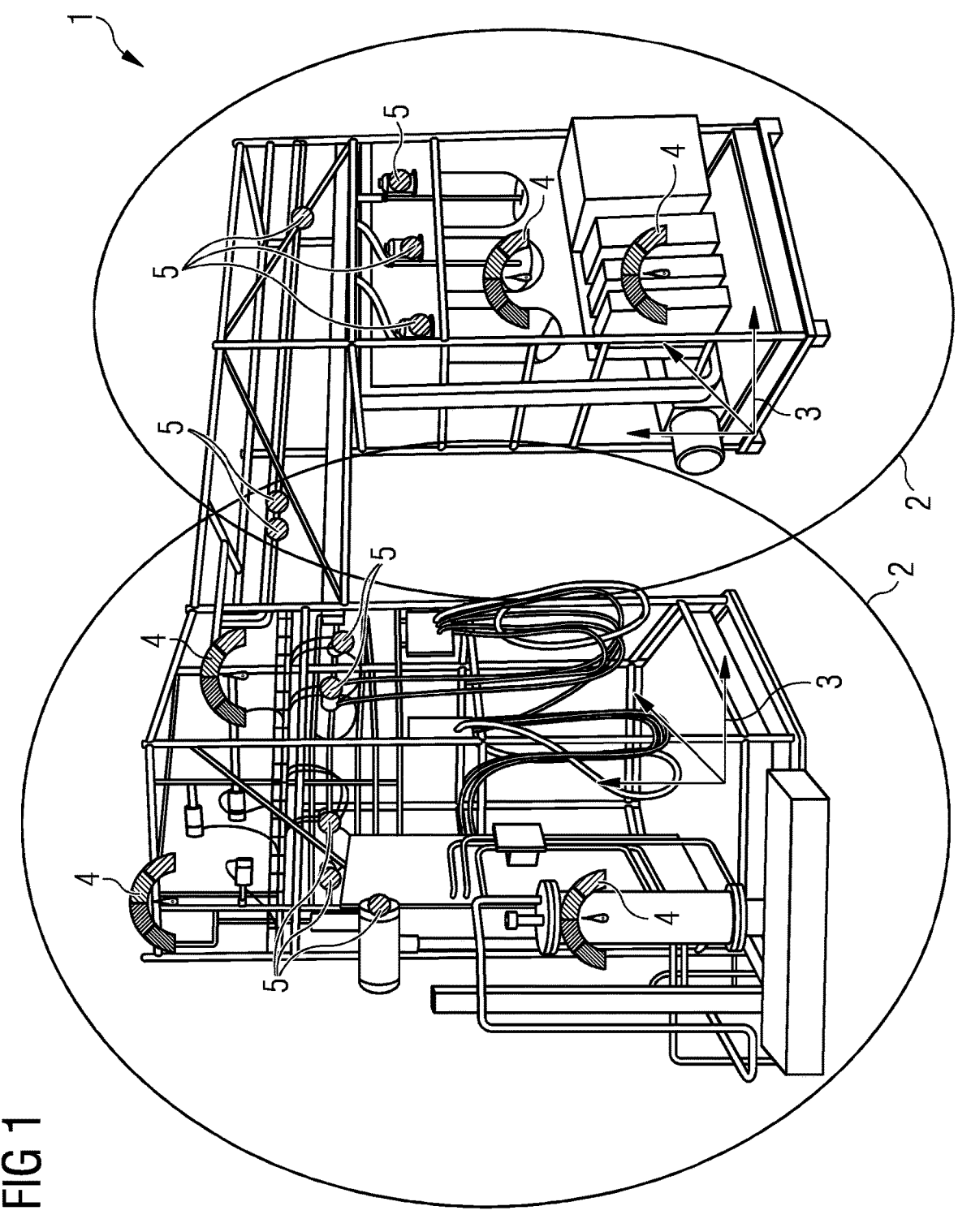
FIG. 1 illustrates an exemplary section of an industrial facility comprising a plurality of industrial devices in indus-trial facility, displayed on an augmented reality device in accordance with the invention.

FIG. 1 illustrates a section 1 of the industrial facility comprising a plurality of industrial devices in industrial facility 100, displayed on an augmented reality device.

Industrial facility herein refers to any environment where one or more industrial processes such as manufacturing, refining, smelting, assembly of equipment may occur and includes process plants, oil refineries, and/or automobile factories. The plurality of industrial devices includes industrial equipment, control devices, field devices, mobile devices, and/or operator stations. The control devices include process controllers, programmable logic controllers, supervisory controllers, automated guided vehicles, robots, and/or operator devices. One or more control devices are connected to a plurality of field devices. The plurality of the field devices includes actuators and sensor devices for monitoring and controlling industrial equipment in the industrial facility.

These field devices can include devices, such as flowmeters, valve actuators, temperature sensors, and/or pressure sensors. All the industrial devices may be connected to each other via one or more network (realized via wired and wireless technologies).

Additionally, as mentioned above, the industrial facility 100 may include an augmented reality device (not shown in FIG. 1) for displaying the status of at least one industrial device in an industrial facility to an operator and for allowing the operator to define KPIs for the control of the industrial processes in the facility. Based on the orientation and the position of the augmented reality device, the augmented reality device is capable of displaying a plurality of graphical elements associated with industrial devices within a view of a camera of the augmented reality device. For example, as shown in FIG. 1, the augmented reality device displays graphical elements (shown in figure as graphical elements 4), when the camera of the augmented reality device is pointed towards the section 100 of the industrial facility. The graphical elements are indicative of one or more parameters associated with the industrial devices within the view of the augmented reality device.

In an example, the augmented reality device contains software that can perform local simultaneous location and mapping (SLAM) for augmented reality. Specifically, the SLAM software can create a 3D SLAM map of local optical features of the world around it and save this map to a server.

Furthermore, the augmented reality device can retrieve a map of pre-stored features from a server and then use that for tracking. This means the augmented reality device "knows" its own position and orientation within an (arbitrary) coordinate system of the SLAM map. The size of this map is limited to certain 3D area, e.g., approximately 10×10×10 meters.

In another example, the augmented reality device also contains a GPS, Wi-Fi-based or similar geolocation device.

This lets it determine its position to within a certain accuracy, e.g., approximately 5 meters outdoors, or 50 meters indoors.

The augmented reality device is connected to a server for displaying the graphical elements. The server includes a map for localization of the augmented reality device to establish the orientation and position of the augmented reality device in relation to the other devices and the equipment in the industrial facility. The map is generated using a portable device and the server. The portable device has all the capabilities associated with the augmented reality device and may be capable of piloting itself around the industrial facility. In an example, the server stores the information of the equipment in each subspace and along with associated metadata, and can provide image processing capabilities such as image recognition, OCR, or 3D object detection.

FIG. 2 illustrates a method 200 of generating a map for augmented reality devices in an industrial facility. The industrial facility comprises a plurality of subspaces. Subspace herein refers to a logical segment or section of an industrial facility comprising at least one industrial device. Each subspace represents at least a part of the physical infrastructure. Each subspace can also be referred to as an augmented reality bubble, i.e., a spatial area with defined limitations and forming an interior dimension system. Although a subspace may be embodied by any arbitrary geometrical shape, a spherical dimension may be chosen for the sake of simplicity. However, the term 'bubble' or 'subspace' is not limited to spherical shapes. Alternatively, straight geometrical shapes in accordance with alternative embodiments may include straight edges in order to support modular stacking of subspaces within a mathematically super-ordinate coordinate system. In accordance with certain embodiments, a spherical dimension of a subspace may be chosen to a diameter of 10 meters, surrounding a particular physical location, e.g., a specific GPS position outdoors, or a specific meeting room indoors, or a specific machine.

In an example, subspaces are determined using a model of the industrial facility. Each subspace from the plurality of subspaces comprises a plurality of anchors. Each anchor from the plurality of anchors of a corresponding subspace is affixed in a corresponding location within the corresponding subspace. In an example, an anchor is affixed on or next to an industrial device within the corresponding subspace. For example, an anchor is a Radio Frequency Identification (RFID) tag affixed on a nameplate of a flowmeter. Each anchor has at least one anchor identifier that describes it in such a way that it can be easily identified as a potential identifier by a user and easily recognized and interpreted by a mobile augmented reality device. An anchor identifier has the property that it is relatively unique, meaning it exists only once within the corresponding subspace (or at least only once in a prominent place, or only a small number of times). Such an anchor identifier can be, for example, the text of an identifier label in a physical plant. These often are already present in chemical, pharmaceutical, or power plants.

Further, an anchor identifier can be, for example, the text of a street sign, poster or other large sign, the content of a bar code or QR code of a label, the category of an object as returned by an image-processing algorithm (for example, "cactus" can be an identifier, if there is only one cactus in the subspace) and/or the category of an object as returned by a 3D object detection algorithm (for example, "Pump type XYZ" can be an identifier, if there is an algorithm that can detect and classify all types of pumps in a process plant).

The information element may also be referred to as holo-gram, which are hereinafter understood as a container for placing technical information precisely at exact positions relative to the real equipment, e.g., a component in the physical infrastructure and augmenting it. A user can place, edit, modify, delete, and/or retrieve/see a hologram. Holo-grams can be annotations, created by users, for users. These annotations can include speech (audio and speech-to-text); floating 3D models such as arrows; drawings; captured photos and videos from the device, or other documents. Holograms can be, for example, text, 3D models, small animations, instruction documents, photos, and/or videos. Holograms can also contain links to live data, e.g., a chart from a temperature sensor that is inside a machine. Or historical data. Each hologram has a 3D position in a coordinate system.

In an example, the SLAM software on the augmented reality device can estimate the distance of identifiers (e.g., anchor identifiers and spatial environment identifiers) from the camera, thereby calculating the position of each identi-fier within the coordinate system of the SLAM software, or other such coordinate systems.

The subspaces are generated such that each subspace includes three or more anchors and such that each subspace overlaps another subspace and in the overlapping area there is at least one anchor. Accordingly, the plurality of anchors of a corresponding subspace includes at least one anchor located in an area overlapping with another subspace from the plurality of subspaces. This is illustrated in FIG. 3, which illustrates a logical representation of a section of the indus-trial facility comprising three subspaces 310, 320 and 330. Each subspace comprises a plurality of anchors. For example, the subspace 310 comprises anchors 311, 313, 316, 319, 350, 360, and 363. Similarly, the subspace 320 com-prises anchors 321, 323, 326, 341, 343 and 339. Similarly, the subspace 330 comprises anchors 336, 333, and 331.

Additionally, the subspace 310 overlaps the subspaces 320 and 330. Accordingly, the anchors 319 and 350 are in the overlapping area between subspace 310 and subspace 320. Similarly, the anchors 350, 360 and 363 are in the overlapping area between subspace 310 and 330. Addition-ally, the subspace 320 overlaps the subspace 330. Accord-ingly, the anchors 339, 341, 343, and 350 are present in the overlapping area between subspace 320 and 330. The anchor 350 is present in the overlapping area common to all three of the subspaces.

In an example, each subspace includes one or more a spatial environment identifier readable by the augmented reality device, in relation the corresponding subspace in which the spatial environment identifier is located. For example, in an office building, "kitchen" could be such a spatial environment identifier in relation to a subspace associated with a kitchen in the office building.

At step 210, the server along with the portable device, obtains position information of a first subspace from the plurality of subspaces using a localization subsystem. The first subspace herein refers to the subspace within which the portable device is currently present. Accordingly, in an example, for determining the first subspace, the portable device scans at least one anchor within the first subspace and based on the locations of the at least one anchor determines the first subspace within which the portable device is pres-ent. In another example, the portable device includes a localization subsystem such as a global positioning system and is capable of determining its location. Then, based on the location of the portable device, the first subspace within which the portable device is present, is determined. In an example, referring to FIG. 3, the portable device is present in the subspace 310. Accordingly, the first subspace is the subspace 310.

Then, at step 220, the server along with the portable device determines a coordinate system for the first subspace based on the obtained position information and a plurality of anchors of the first subspace. In an example, referring to FIG. 3, based on the location of the portable device within the first subspace, the portable device along with the server, determines a coordinate system for the subspace 310. Accordingly, the coordinates of each anchor within the first subspace 310 is determined using the coordinate system.

Coordinate system as mentioned herein can refer to any well-known coordinate system/such as a cartesian coordi-nate system, and/or a polar coordinate system.

Then, at step 230, the server along with the portable device, calculates a relative position and an orientation of at least one neighboring subspace based on the determined coordinate system, for generating the map based on the position information of the first subspace and the relative position of the at least one neighboring subspace. As men-tioned above, the at least one neighboring subspace includes one or more anchors in an area overlapping the first sub-space.

Continuing with the above example in relation to FIG. 3, subsequent to the generation of the coordinate system for the first subspace, the coordinates of the anchors in relation to the coordinate system are calculated. This especially includes the anchors in the overlapping areas with the subspaces 320 and 330. Accordingly, the coordinates of anchors 319, 350, 360 and 363 are calculated using the coordinate system of the first subspace 310. Then based on the coordinates of the anchors in the overlapping areas, the server along with the portable device calculates the coordi-nates of the anchors in the subspaces 320 and 330 using the coordinate system. Accordingly, coordinate system of the first subspace is extended to the other subspaces. Accord-ingly, by calculating the coordinates of the anchors in the subspaces 320 and 330, the server along with the portable device calculates the relative positions and orientations of the subspaces 320 and 330. This may be performed using a plurality of well-known transformation techniques. For example, a technique for best-fitting a rigid transformation that aligns two sets of corresponding points as described in 'Least-Squares Rigid Motion Using SVD', Hornung and Rabinovich, ETH Zurich, 2017, may be used. Then, the calculated coordinates of the anchors and the position and orientation information of the subspaces are stored as the map of the section of the industrial facility. This map may be used by augmented display devices to improve the display of graphical elements. This is further explained in the descrip-tion to FIG. 4.

In an example, the coordinate system determined in the above mentioned method 200 is further augmented with position information from a location system, such as a GPS system. For example, the industrial facility is a portable facility (for example, a portable or modular industrial sys-tem) and may be shipped to a different location. Accord-ingly, the coordinate system and the coordinates and posi-tions calculated above are referential values prior to shipping of the industrial system and upon installation of the industrial facility at a particular location, position informa-tion of the particular location is used to transform the map and the coordinate system from relative values to absolute values.

In an example, the method 200 includes generating a graph associated with the plurality of subspaces. The graph comprises a plurality of nodes and edges. Each node from the plurality of nodes is associated with one of a subspace from the plurality of subspaces and an anchor from a first set of anchors. Each anchor from the first set of anchors is in at least one area overlapping a one subspace and another subspace from the plurality of subspaces. An example of such a graph is illustrated in FIG. 5.

Figure 5:
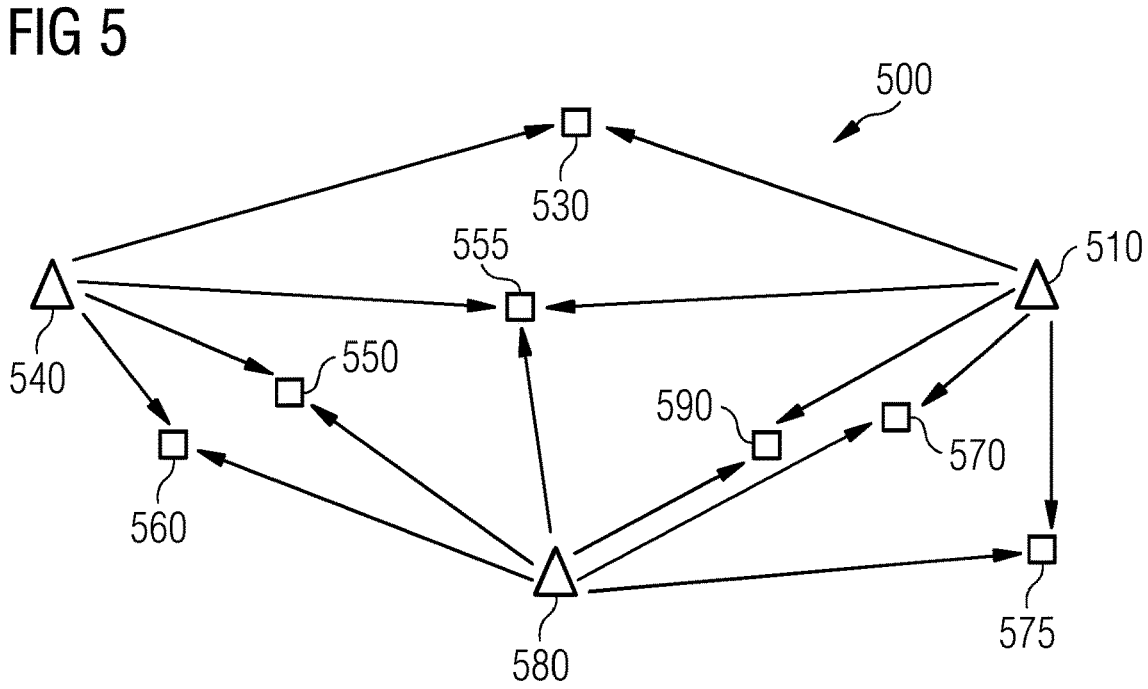
FIG. 5 illustrates an exemplary graph generated in relation to the subspaces shown in FIG. 3.

FIG. 5 illustrates an example graph 500 generated in relation to the sub spaces shown in FIG. 3. Each subspace (310, 320 and 330) is illustrated as a node (510, 540 and 580) in the graph 500. Further, each anchor (319, 350, 360, 363, 341, 343, 339) in overlapping areas between the subspaces 310, 320 and 330 are further illustrated as nodes (530, 555, 550, 560, 590, 570, 575) in the graph 500. An edge from a subspace node to an anchor node indicates that the corresponding anchor is within the corresponding subspace. For example, subspace node 540 having an edge to an anchor node 550, is indicative that the anchor 360 (represented by anchor node 550) is within subspace 310 (represented by subspace node 540). Subsequent to the generation of the graph, a subspace is chosen as an initial sub space and then subspaces neighboring the first subspace within a certain radius is queried from the map. Then, a depth-first search of the graph is then performed in which the relative transforms of all the subspaces with respect to the first subspace is calculated by successive transform-matrix multiplications. In an example, if cyclic subgraphs are present in the above mentioned graph, the above mentioned transformation is carried out in a cycle and the position of the initial bubble could be computed from two other bubbles. This could be used to improve the relative position of all bubbles in the cyclic graph by optimizing their respective origins to optimally align the overlapping anchors. If one bubble is part of two or more cyclic subgraphs, the optimization could be enlarged to the union of all subgraphs.

Figure 4:
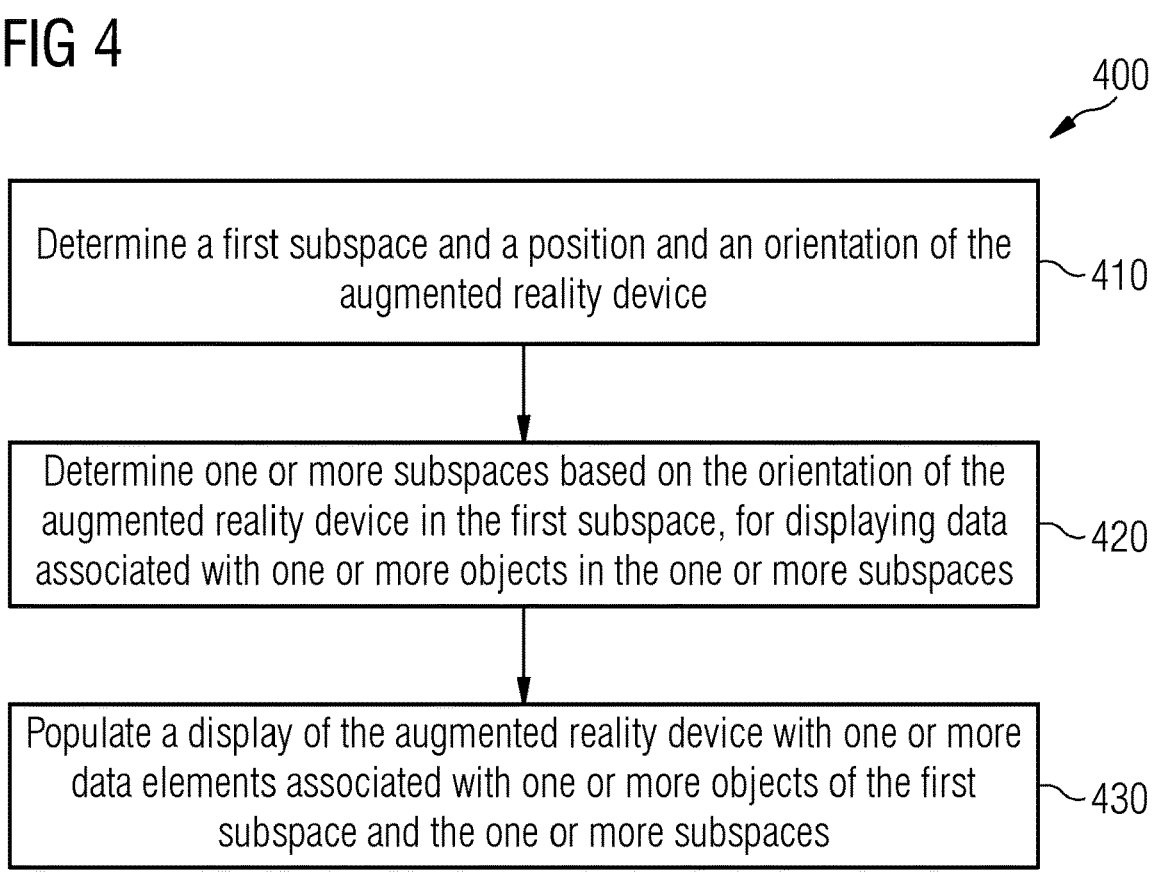
FIG. 4 illustrates a flowchart of a method for displaying data on an augmented reality device in an industrial facility in accordance with the invention.

FIG. 4 illustrates a method 400 for displaying data on an augmented reality device in an industrial facility. As mentioned above, the industrial facility comprises a plurality of subspaces (for example, subspaces 310, 320 and 330).

At step 410, the augmented reality device determines a first subspace and a position and an orientation of the augmented reality device in the first subspace. The augmented reality device is present within the first subspace in the industrial facility. In an example, the augmented reality device determines a first set of anchors within a first subspace from the plurality of subspaces. Each anchor from the first set of anchors, is present in the first subspace. Based on the determined anchors in the first subspace, the augmented reality device determines a position and an orientation of the augmented reality device in the first subspace. In another example, the augmented reality device uses one or more of its mapping sensors to generating a simultaneous localization and mapping (SLAM) map for determining the first subspace and the orientation and position of the augmented reality device. In an example, the one or more mapping sensors includes acoustic sensors, laser sensors, etc.

Then at step 420, the augmented reality device determines at least one other subspace based on the orientation of the augmented reality device in the first subspace, for displaying data associated with at least one object in the at least one subspace. For determining the at least one other space, the augmented reality device utilizes the map generated above by the server. Subsequent to the determination of the first subspace, the augmented reality device obtains the above mentioned map from the server. Then based on the position and orientation of the augmented reality device in the first subspace, the augmented reality device utilizes the map to determine its coordinates in relation to the coordinate system of the map. Then based on its coordinates, the augmented reality device then determines the subspaces and the anchors that are likely to be within the view of the camera of the augmented reality device. As mentioned previously, each subspace from the one or more other sub spaces includes at least one anchor in an area overlapping one or more of the first subspace and another subspace from the at least one other subspace.

Then, at step 430, the augmented reality device populates a display of the augmented reality device with at least one data element associated with at least one object of the first subspace and the at least one other subspace. Based on the determined at least one other subspace and the position and orientation of the augmented reality device, the augmented reality device determines the data elements for the objects in the first subspace and the at least one subspaces. Then, based on the coordinates of the objects, the augmented reality device determines positions of the data elements on the display of the augmented reality device. Accordingly, by using the map, the augmented reality device can generate and position the data elements, effectively. The data elements displayed by the above method can assist a user to perform actions at exact positions and increases the accuracy of those actions.

In an example, the above mentioned method 400 further includes assigning weights to anchors and subspaces based on the distance of anchors and the subspaces from the augmented reality device. Accordingly, for the subspaces that are further away from the augmented reality device than a predefined threshold distance, data elements associated with the equipment or industrial devices in these sub spaces are not displayed.

In an example, when two subspaces may have no anchors in an overlapping area, the portable device along with the server can create an anchor such that the anchor is present in both the subspaces or can modify an existing anchors in one of the subspaces to be present in both the subspaces. For example, subsequent to the determination of a coordinate system for the first subspace, the portable device could approach an existing anchor in the second subspace and calculates its position in relation to the first subspace using the coordinate system. Accordingly, the existing anchor is included in the first subspace. While this is explained above with a single anchor between two subspaces, the above aspect can extended to modifying or adding multiple anchors between multiple subspaces. The present disclosure can take the form of a computer program product comprising computer-usable or computer-readable medium storing program code for use by or in connection with one or more computers, processing units, or instruction execution system. For example, the method 200 or the method 400 may be realized in a single device or across one or more devices.

Accordingly, the current disclosure describes a server for generating a map for augmented reality devices in an industrial facility comprising a plurality of subspaces. The server comprises at least one processor connected to a non-transitory memory module that includes a plurality of instruction. The at least one processor of the server is configured to, upon execution of the instructions, obtain position information of a first subspace from the plurality of subspaces, determine a coordinate system for the first subspace based on the obtained position information and a plurality of anchors of the first subspace, and calculate, a relative position and an orientation of at least one neighboring subspace based on the determined coordinate system, for generating the map based on the position information of the first subspace and the relative position of the at least one neighboring subspace, where the at least one neighboring subspace includes one or more anchors in an area overlapping the first subspace.

Additionally, the current disclosure describes an augmented reality device for displaying data associated with at least one object in an industrial facility comprising a plurality of subspaces. The augmented reality device comprises one or more processors connected to a non-transitory memory module which comprises a plurality of instructions. Upon execution of the instructions, the at least one processor determines a first subspace and a position and an orientation of the augmented reality device in the first subspace, where the augmented reality device is within the first subspace in the industrial facility, determine at least one o other subspace based on the orientation of the augmented reality device in the first subspace, for displaying data associated with at least one object in the at least one subspace, where each subspace from the at least one other subspace includes at least one anchor in an area overlapping at least one of the first sub space and another subspace from the at least one other subspace and populate a display of the augmented reality device with at least one data element associated with at least one object of the first subspace and the at least one other subspace.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, DVD and Blu ray. Both processing units and program code for implementing each aspect of the technology can be centralized or distributed (or a combination thereof) as known to those skilled in the art.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for generating a map for augmented reality devices in an industrial facility comprising a plurality of subspaces, each subspace from the plurality of subspaces comprising a plurality of anchors, and a plurality of anchors of a corresponding subspace including at least one anchor of the plurality of anchors located in an area overlapping with another subspace from the plurality of sub spaces, the method comprising:

a) obtaining position information of a first subspace from the plurality of subspaces;

b) determining a coordinate system for the first sub space based on an obtained position information and a plurality of anchors of the first subspace, each anchor being affixed on or next to an industrial device within a corresponding subspace; and c) calculating a relative position and an orientation of at least one neighboring subspace based on the determined coordinate system to generate the map based on the position information of the first subspace and the relative position of the at least one neighboring subspace, the at least one neighboring subspace including at least one anchor in an area overlapping the first subspace;

wherein calculating the relative position and the orientation of the at least one neighboring subspace further comprises:

generating a graph associated with the plurality of sub spaces, the graph comprising a plurality of nodes and edges, each node from the plurality of nodes being associated with one of a subspace from the plurality of subspaces and an anchor from a first set of anchors, and each anchor from the first set of anchors being in at least one area overlapping a single subspace and another subspace from the plurality of sub spaces, choosing a first subspace from the plurality of subspaces as an initial subspace, and performing a depth-first search of the graph, performing the depth-first search including calculating relative transforms of at least one subspace with respect to the first subspace using at least one transform matrix multiplication.

2. The method as claimed in claim 1, further comprising: obtaining position information of the first subspace from the plurality of subspaces.

3. A method for displaying data on an augmented reality device in an industrial facility comprising of a plurality of subspaces, the method comprising:

a) determining a first subspace and a position and an orientation of the augmented reality device in the first subspace, the augmented reality device being within the first subspace in the industrial facility;

b) determining at least one other subspace based on the orientation of the augmented reality device in the first subspace to display data associated with at least one object in the at least one subspace, each subspace from the at least one subspace including at least one anchor in an area overlapping the at least one first sub space and another subspace from the at least one other subspace, and each anchor being affixed on or next to an industrial device within a corresponding subspace; and c) populating a display of the augmented reality device with at least one data element associated with the at least one object of the first subspace and the at least one other sub space.

4. The method as claimed in claim 3, further comprising: determining a first set of anchors in the first sub space for determining the first sub space and the orientation and position of the augmented reality device in the first sub space;

wherein each anchor from the first set of anchors comprises a physical identifier affixed at a corresponding location within the first sub space.

5. The method as claimed in claim 4, further comprising: generating a map for determining the first sub space and the orientation and position of the augmented reality device, using at least one mapping sensor.

6. A server for generating a map for augmented reality devices in an industrial facility comprising a plurality of subspaces, each subspace from the plurality of subspaces comprising a plurality of anchors, a plurality of anchors of a corresponding subspace including at least one anchor located in an area overlapping with another subspace from the plurality of subspaces, the server comprising:

a. at least one processor connected to a non-transitory memory module, the at least one processor being configured to:

i. obtain position information of a first subspace from the plurality of subspaces;

ii. determine a coordinate system for the first subspace based on the obtained position information and a plurality of anchors of the first subspace, each anchor being affixed on or next to an industrial device within a corresponding subspace; and iii. calculate a relative position and an orientation of at least one neighboring subspace based on the determined coordinate system to generate the map based on the position information of the first subspace and the relative position of the at least one neighboring subspace, the at least one neighboring subspace including at least one anchor in an area overlapping the first subspace.

7. A non-transitory storage medium for generating a map for augmented reality devices in an industrial facility comprising a plurality of subspaces, each subspace from the plurality of subspaces comprising a plurality of anchors, a plurality of anchors of a corresponding subspace including at least one anchor located in an area overlapping with another subspace from the plurality of subspaces, the non-transitory storage medium comprising a plurality of instructions which, when executed on at least one processor, cause the at least one processor to:

a) obtain position information of a first subspace from the plurality of subspaces;

b) determine a coordinate system for the first subspace based on the obtained position information and a plurality of anchors of the first subspace, each anchor being affixed on or next to an industrial device within a corresponding subspace; and c) calculate a relative position and an orientation of at least one neighboring subspace based on the determined coordinate system to generate the map based on the position information of the first subspace and the relative position of the at least one neighboring subspace, the at least one neighboring subspace including at least one anchor in an area overlapping the first subspace.

8. An augmented reality device for displaying data associated with at least one object in an industrial facility comprising a plurality of subspaces, the augmented reality device comprising:

a) at least one processor connected to a non-transitory memory module, the at least one processor being configured to:

i) determine a first subspace and a position and an orientation of the augmented reality device in the first sub space, the augmented reality device being within the first subspace in the industrial facility;

ii) determine at least one other subspace based on the orientation of the augmented reality device in the first subspace to display data associated with at least one object in the at least one subspace, each subspace from the at least one other subspace including at least one anchor in an area overlapping one or more of the first sub space and another subspace from the at least one other subspace, and each anchor being affixed on or next to an industrial device within a corresponding subspace; and iii) populate a display of the augmented reality device with at least one data element associated with the at least one object of the first subspace and the at least one sub space.

9. A non-transitory storage medium for displaying data associated with at least one object in an industrial facility comprising a plurality of subspaces, the non-transitory storage medium comprising a plurality of instructions which, when executed, on at least one processor, cause the at least one processors to:

a) determine a first sub space and a position and an orientation of the augmented reality device in the first subspace, the augmented reality device being within the first subspace in the industrial facility;

b) determine at least one other subspace based on the orientation of the augmented reality device in the first subspace to display data associated with at least one object in the at least one subspace, each subspace from the at least one other subspace including at least one anchor in an area overlapping at least one of the first sub space and another subspace from the at least one other subspace, and each anchor being affixed on or next to an industrial device within a corresponding subspace; and c) populate a display of the augmented reality device with at least one data element associated with the at least one object of the first subspace and the at least one other subspace.

* * * * *